Figure 4:
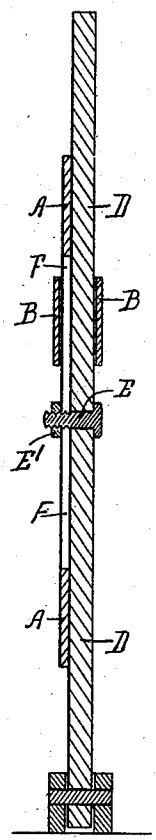

(No Model.) 3 Sheets—Sheet 1.
T. KENDRAY.
SLIDING TUG STRAP HOLDER FOR POWER LOOMS.
No. 351,779. Patented Nov. 2, 1886.
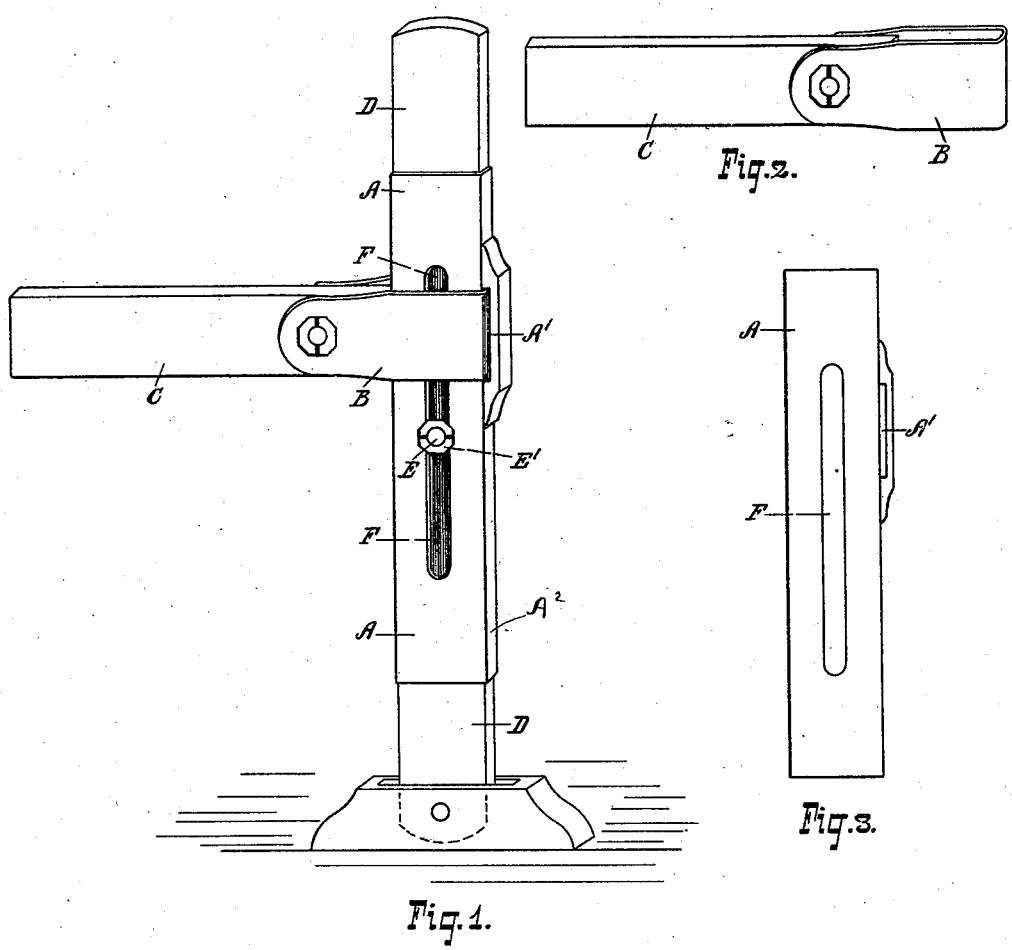
Witnesses
A. Edmunds
Carl Hayden
Inventor
Thomas Kendray
By P. J. Edmunds
Attorney (No Model.) 3 Sheets—Sheet 2.

T. KENDRAY.
SLIDING TUG STRAP HOLDER FOR POWER LOOMS.

No. 351,779. Patented Nov. 2, 1886.

Witnesses
A. Edmunds
Carl Hayden

Inventor
Thomas Kendray
By P. J. Edmunds
Attorney (No Model.) 3 Sheets—Sheet 3.

T. KENDRAY.
SLIDING TUG STRAP HOLDER FOR POWER LOOMS.

No. 351,779. Patented Nov. 2, 1886.

Witnesses
A. Edmunds
Carl Hayden

Inventor
Thomas Kendray
By P. J. Edmunds
Attorney

United States Patent Office.

THOMAS KENDRAY, OF SARNIA, ONTARIO, CANADA, ASSIGNOR OF ONE-HALF TO GEORGE N. MATHESON, OF SAME PLACE.

SLIDING TUG-STRAP HOLDER FOR POWER-LOOMS.

SPECIFICATION forming part of Letters Patent No. 351,779, dated November 2, 1886.

Application filed February 6, 1886. Serial No. 191,066. (No model.) Patented in Canada March 9, 1886, No. 23,576; in England March 18, 1886, No. 3,819; in Belgium April 15, 1886, No. 72,636, and in France August 10, 1886, No. 175,214.

*To all whom it may concern:*

Be it known that I, THOMAS KENDRAY, a subject of the Queen of Great Britain, and a resident of Sarnia, in the Province of Ontario, Canada, have invented new and useful Improvements on Sliding Tug-Strap Holders for Power-Looms, of which the following is a specification.

In common practice the tug-strap is held by a leather loop, in combination with a picker-staff, as follows: The tug-strap passes through a leather loop, and a common screw is passed through the ends of the strip of leather, which were brought together to form this loop, and into the picker-staff, and the tug-strap is adjusted at any required height on the picker-staff by drawing the screw out of the screw-hole in which it was inserted and inserting it again into another screw-hole at another point, higher or lower on the picker-staff, as required. The disadvantages of this construction, or any construction where common screws are used to secure this loop or any equivalent to the picker-staff, are as follows: by drawing the screw out of one screw-hole and inserting it into another in the picker-staff to adjust the tug-strap higher or lower thereon, a number of screw-holes are formed in this picker-staff, which weakens it; and even if the screw were driven in and out of the same screw-hole in the picker-staff to permit the tug-strap to be adjusted thereon, after driving this screw in and out of the same screw-hole a few times it would wear this screw-hole so large that the said screw would drop out when the picker-staff was operated. This screw would then have to be inserted into the picker-staff at another point where the same result would again follow and so on, until the weakening of the picker-staff by these screw-holes and the necessary binding of the screw in the new screw-hole in the picker-staff, to securely hold it therein, would check or crack the picker-staff and render it utterly useless, so much so that as soon as the latter was operated the screw would fall out of any screw-hole formed therein, which would necessitate the stopping of the loom while the old picker-staff was removed and a new one inserted in its place. There is a loss of time in renewing the picker-staff, as the machinery has to be stopped to do so, a loss of material, as the picker-staff is rendered valueless, and a loss of labor, as a new picker-staff has to be manufactured. And not only that, but another disadvantage is met in using the common leather loop—viz., the leather loop being pliable and only secured at the upper end to the picker-staff, as the latter moves forward to impel the shuttle, the lower part of the leather loop is caused to rise up on the picker-staff by the jerk of the connecting-rod, permitted by the looseness of the loop, so that an uneven motion is given to the shuttle, and more motion sometimes given than is actually required, and the picker-staff is jerked or jarred, so that in a short time it is rendered useless. All of these disadvantages are completely overcome by using my invention.

My invention consists of the combination, with the actuating-rod, the tug-strap, the picker-staff, and a securing bolt and nut, of a slide having a flange to fit against the rear side of the staff, formed with a slot in a lug on its flanged portion to receive the tug-strap, and in its body with a vertical slot for the reception of the securing-bolt, the slide being thereby rendered vertically adjustable. The securing-bolt passes through a slot in the slide and through an aperture in the picker-staff, and the slide and picker-staff are bound together between an enlarged head formed on one end of the bolt and a nut screwed on the other end, by tightening which nut the slide and picker-staff are rigidly bound together, as well as the tug-strap to which the connecting-rod is attached, as it is secured in a separate slot in a lug on the flanged portion of said slide.

When it is required to adjust the tug-strap on the picker-staff, the nut on the bolt which passes through the picker-staff is loosened to permit of the adjustment of the slide and tug-strap secured thereto on the picker-staff, and when properly adjusted the tug-strap is rigidly held at that position by tightening the nut again, and on all occasions, as well as when the tug-strap is being adjusted, the bolt remains stationary and rests perfectly free in the aperture in the picker-staff, thereby completely avoiding the turning in and out of a threaded screw, which is so disastrous to picker-staffs, so that a picker-staff having combined therewith my tug-strap holder retains the same strength and durability as when first inserted in the machine.

The picker-staff is strengthened by being braced by the flange on the slide, as well as by the slide itself, the body and flange of the slide covering two sides of the picker-staff, and thereby increasing the strength and durability of the staff.

The object of my invention is also to save time, and as a result of saving time the loom works more continuously, so that more work or yards are produced by each loom, and labor and material are also saved by using my invention, a large percentage of all of which is lost by using the inventions in common use; and my invention will not only effect this result, but will give a steady even motion to the picker-staff and shuttle, and at the same time permit a fine adjustment of the tug-strap on the picker-staff.

The construction and operation will be more fully described and claimed, with reference to the accompanying drawings, wherein—

Figure 5:
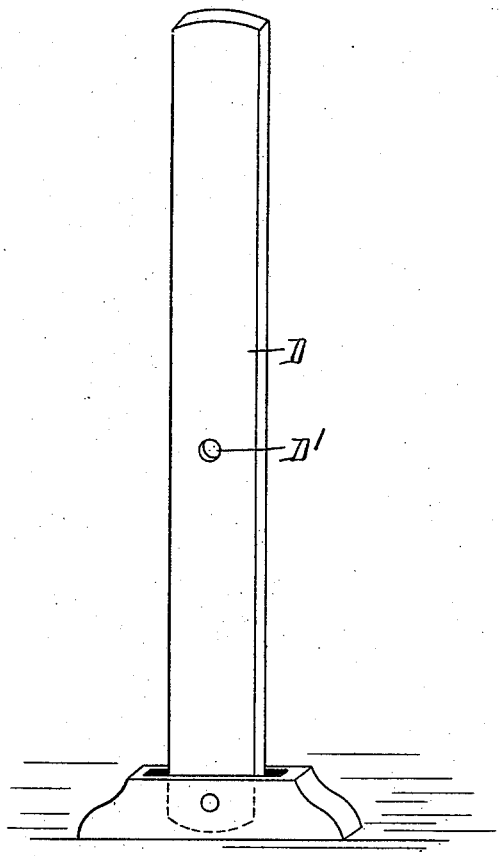
Figure 6:
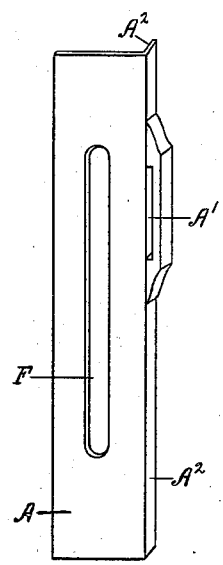

Figure 1 is a perspective view of the devices embodying my invention. Fig. 2 is a detail perspective view of the tug-strap, showing the connecting-rod attached. Fig. 3 is a side elevation of the slide. Fig. 4 shows a vertical section of the picker-staff and slide. Fig. 5 shows a perspective view of the picker-staff. Fig. 6 is a perspective view of the slide.

A designates a slide, formed through the body of which is a vertical slot, F, and which is also formed with a slot, A', in a lug on its flanged portion $A^2$.

B designates a tug-strap, which passes through the slot A', and the free ends of this tug-strap B are secured to a connecting-rod, C.

D designates a picker-staff, through which is formed an aperture, D'.

E designates a bolt formed with an enlarged head and provided with a nut, E'; or another nut may be used on this bolt in lieu of the enlarged head. In either case the nuts E' or enlarged head of the bolt E are constructed sufficiently large to bridge over the slot F and aperture D' in slide A and picker-staff D, respectively.

This mechanism is secured together as follows: The tug-strap B is fitted to and secured in place in the slot A', and the free ends of this tug-strap are secured to the connecting-rod C. The slide A is then placed on the picker-staff D so that the slot F and aperture D' will come opposite each other. The bolt E is then inserted into and through the slot F and aperture D', in which slot F and aperture D' the bolt rests perfectly free, and the end of the bolt projects through this slot and aperture beyond the slide and picker-staff far enough to engage with a nut, E', by screwing which nut E' up on said bolt E the slide A and picker-staff D are rigidly secured together. By loosening this nut E' the elongated slot F permits the slide A, together with the tug-strap B and connecting-rod C secured thereto, to be adjusted at any height on the picker-staff D to give any pick or stroke required by the picker-staff without moving or changing the position of the bolt E.

By constructing the picker-staff D with an aperture, D', the bolt E, which rigidly secures the slide A to said picker-staff, rests perfectly free in slot F and aperture D', thereby preventing the wearing of the picker-staff or slide by the device which secures them together. This construction gives a strong and durable picker-staff and firm holder for the tug-strap, which are seldom renewed, if at all, so that no time is lost in stopping the machinery to insert a new picker-staff or holder, the loom thereby works more continuously, so that more work or yards can be produced by each loom in which my invention is used than by using the invention in common use, and no labor or material is used to make a new picker-staff or holder, so that by using my invention time, labor, and material are saved, and more work or yards produced by each loom, which is a considerable monetary saving in the running expenses of a power-loom; and also by having the tug-strap firmly secured in place, as shown, in my improved holder, an even steady motion is insured to the picker-staff and shuttle; and, further, the sliding holder is capable of a very fine adjustment when constructed in this manner.

Having thus described my invention, what I claim as new, and desire to secure by Letters Patent, is—

The combination, with the rod C, the tug-strap B, the picker-staff D, formed with an aperture, D', a securing-bolt, E, formed with an enlarged head, and nut E', of a slide, A, having a flange, $A^2$, a slot, A', to receive the tug-strap, and a vertical slot, F, for the reception of the securing-bolt, the slide being thereby rendered vertically adjustable, substantially as and for the purpose hereinbefore set forth.

In testimony whereof I affix my signature in the presence of the two undersigned witnesses.

THOS. KENDRAY.

Witnesses:
P. J. EDMUNDS,
A. EDMUNDS.